United States Patent
Yu et al.

(10) Patent No.: US 8,368,322 B2
(45) Date of Patent: Feb. 5, 2013

(54) DRIVING CIRCUIT FOR LED LAMP

(75) Inventors: Zuo-Shang Yu, Fuqing (CN);
Tsung-Yen Lee, Fuqing (CN); Jie Feng, Fuqing (CN)

(73) Assignee: TPV Electronics (Fujian) Co., Ltd., Fuqing (CN)

( * ) Notice: Subject to any disclaimer, the term of this patent is extended or adjusted under 35 U.S.C. 154(b) by 211 days.

(21) Appl. No.: 13/030,968

(22) Filed: Feb. 18, 2011

(65) Prior Publication Data
US 2011/0309758 A1 Dec. 22, 2011

(30) Foreign Application Priority Data
Jun. 22, 2010 (TW) ................................ 99211788 U

(51) Int. Cl.
*H05B 41/36* (2006.01)

(52) U.S. Cl. .............. 315/306; 315/209 R; 315/225; 315/307; 315/299

(58) Field of Classification Search .......... 315/88, 315/89, 91, 119, 121, 122, 123, 125, 127, 315/128, 185 R, 186, 192, 193, 209 R, 210, 315/225, 226, 291, 294, 297, 299, 306, 307, 315/308, 312, 320, 361, 362, 7

See application file for complete search history.

(56) References Cited

U.S. PATENT DOCUMENTS

| | | | | |
|---|---|---|---|---|
| 4,017,847 A | * | 4/1977 | Burford et al. | 345/46 |
| 4,139,878 A | * | 2/1979 | Shuey | 361/94 |
| 2004/0155844 A1 | * | 8/2004 | Stopa | 345/82 |
| 2008/0164828 A1 | * | 7/2008 | Szczeszynski et al. | 315/300 |

* cited by examiner

*Primary Examiner* — Douglas W Owens
*Assistant Examiner* — Jianzi Chen
(74) *Attorney, Agent, or Firm* — Alan Kamrath; Kamrath IP Lawfirm, P.A.

(57) ABSTRACT

A driving circuit for an LED lamp including no more than 4 strings each having an input and an output terminals outputs a DC voltage of no more than 70V to the input terminals. The driving circuit includes constant current circuits each coupled between the output terminal of a corresponding string and ground. An on-off control signal controls whether the constant current circuits work to control whether the LED lamp works. A dimming control signal controls a duty cycle of working of to the constant current circuits to control a brightness of the LED lamp. The driving circuit further includes an overvoltage protection circuit and a switch. When a voltage at one input terminal is too high or a short circuit occurs in one string, the overvoltage protection circuit outputs an overvoltage control signal and accordingly the switch forces the on-off control signal to control the constant current circuits not to work.

10 Claims, 7 Drawing Sheets

DRIVING CIRCUIT FOR LED LAMP

BACKGROUND OF THE INVENTION

1. Field of the Invention

The present invention relates to a driving circuit for a light-emitting diode (LED) lamp. More particularly, the present invention relates to a driving circuit for an LED lamp including fewer strings each through which more current flows.

2. Description of the Related Art

A liquid crystal display (LCD) such as LCD monitor gradually uses an LED lamp as a backlight source. The LED lamp includes plenty of LEDs and hence the LEDs are coupled in series and/or parallel. A driving circuit for the LED lamp usually uses a direct-current (DC) to DC boost is converter so that a specific-purpose integrated circuit (IC) is required to control the DC to DC boost converter.

FIG. 1 is a schematic diagram illustrating a conventional driving circuit for an LED lamp. Referring to FIG. 1, an LED lamp includes a plurality of strings 21-2n and each string 2i has an input terminal 21i and an output terminal 22i, where n is a positive integer and i is any integer from 1 to n. Each string 2i includes a plurality of LEDs coupled in series between the input terminal 21i and the output terminal 22i. A driving circuit for the LED lamp includes an alternating-current (AC) to DC converter 1 and a DC to DC boost converter 7. An AC voltage of 90-264 Vrms is input to the AC to DC converter 1. The AC to DC converter 1 converts the AC voltage into two DC voltages. A DC voltage of 12-19V is outputted from a terminal 121 to the DC to DC boost converter 7. Another DC voltage of 5V is outputted from a terminal 122 to a mainboard circuit 2.

The DC to DC boost converter 7 includes a boost circuit 71, an output filter circuit 72, a pulse-width modulation (PWM) controller 73 and an overvoltage detector 74. The boost circuit 71 converts the DC voltage of 12V-19V into a pulsating DC voltage. The output filter circuit 72 filters the pulsating DC voltage into a DC voltage to output to the input terminal 211-21n of the strings 21-2n to drive the LED lamp. The PWM controller 73 is a specific-purpose IC having a plurality of feedback terminals coupled to the output terminal 221-22n of the strings 21-2n, respectively, for controlling the current balance and short protection of the strings 21-2n; a dimming terminal coupled to a dimming control signal outputted from a terminal 123 of the mainboard circuit 2 for controlling the brightness of the LED lamp; and, an enable terminal coupled to an on-off control signal outputted from a terminal 124 of the mainboard circuit 2 for controlling whether the PWM controller 73 works or not. The PWM controller 73 outputs a PWM signal from a terminal 125 to control the amount of energy outputted from the boost circuit 71 so as to control the amount of current flowing through the LED lamp.

However, LED lamps fabricated by different manufacturers or even by the same manufacturer often differ in the number of strings, such as 1-8 strings. Accordingly, a PWM controller IC is usually designed to have more feedback terminals to be adapted for more LED lamps with different number of strings and each feedback terminal allows more current to flow thereto. The specific-purpose PWM controller IC is certainly expensive and hence the driving circuit using the specific-purpose PWM controller IC is also expensive. In addition, for example, a PWM controller IC (model name "TA9690GN" fabricated by $O_2$Micro Inc.) has 8 feedback terminals and each feedback terminal allows current of about 50 mA to flow thereto. An LED lamp in a 21.5-inch LCD panel (model name "LM215WF4" fabricated by LG Corp.) includes 2 strings and each string allows current of about 160 mA to flow therethrough. If the LED lamp in the LCD panel (model name "LM215WF4") is driven by the PWM controller IC (model name "TA9690GN"), it will waste design cost.

SUMMARY OF THE INVENTION

Accordingly, a driving circuit is provided for driving an LED lamp including fewer strings each through which more current flows without using a specific-purpose PWM controller IC.

According to an aspect of the present invention, a driving circuit for an LED lamp is provided. The LED lamp includes no more than 4 strings. Each string has an input terminal and an output terminal. Each string includes a plurality of LEDs coupled in series between the input and the output terminals. The driving circuit receives an on-off control signal and a dimming control signal and outputs a DC voltage of no more than 70V to the input terminals of the strings. The driving circuit includes a plurality of diodes, an overvoltage protection circuit, a plurality of constant current circuits and a switch. Each diode has an anode terminal coupled to the output terminal of a corresponding string and a cathode terminal. The overvoltage protection circuit coupled to the cathode terminals of the diodes outputs an overvoltage control signal when a voltage at the output terminal of one of the strings is greater than a threshold voltage. Each constant current circuit coupled between the output terminal of a corresponding string and ground. The on-off control signal controls whether the constant current circuits work or not so as to control whether the LED lamp works or not. The dimming control signal controls a duty cycle of working of the constant current circuits so as to control a brightness of the LED lamp. The switch forces the on-off control signal to control the constant current circuits not to work when receiving the overvoltage control signal.

The invention introduces the driving circuit to directly supply power to the LED lamp including fewer strings each through which more current flows without using a specific-purpose PWM controller IC so as to reduce design cost and avoid the EMI problem caused by the switching of the power transistor(s) of the DC to DC boost converter. Moreover, the invention introduces the constant current circuits to control the currents flowing through the strings to be constant when working and accordingly uses the PWM dimming. Furthermore, the overvoltage protection circuit to perform the overvoltage protection when a voltage at one input terminal is too high or a short circuit occurs in one string.

BRIEF DESCRIPTION OF THE DRAWINGS

The foregoing and other features of the disclosure will be apparent and easily understood from a further reading of the specification, claims and by reference to the accompanying drawings in which:

DETAILED DESCRIPTION OF THE INVENTION

Figure 1:
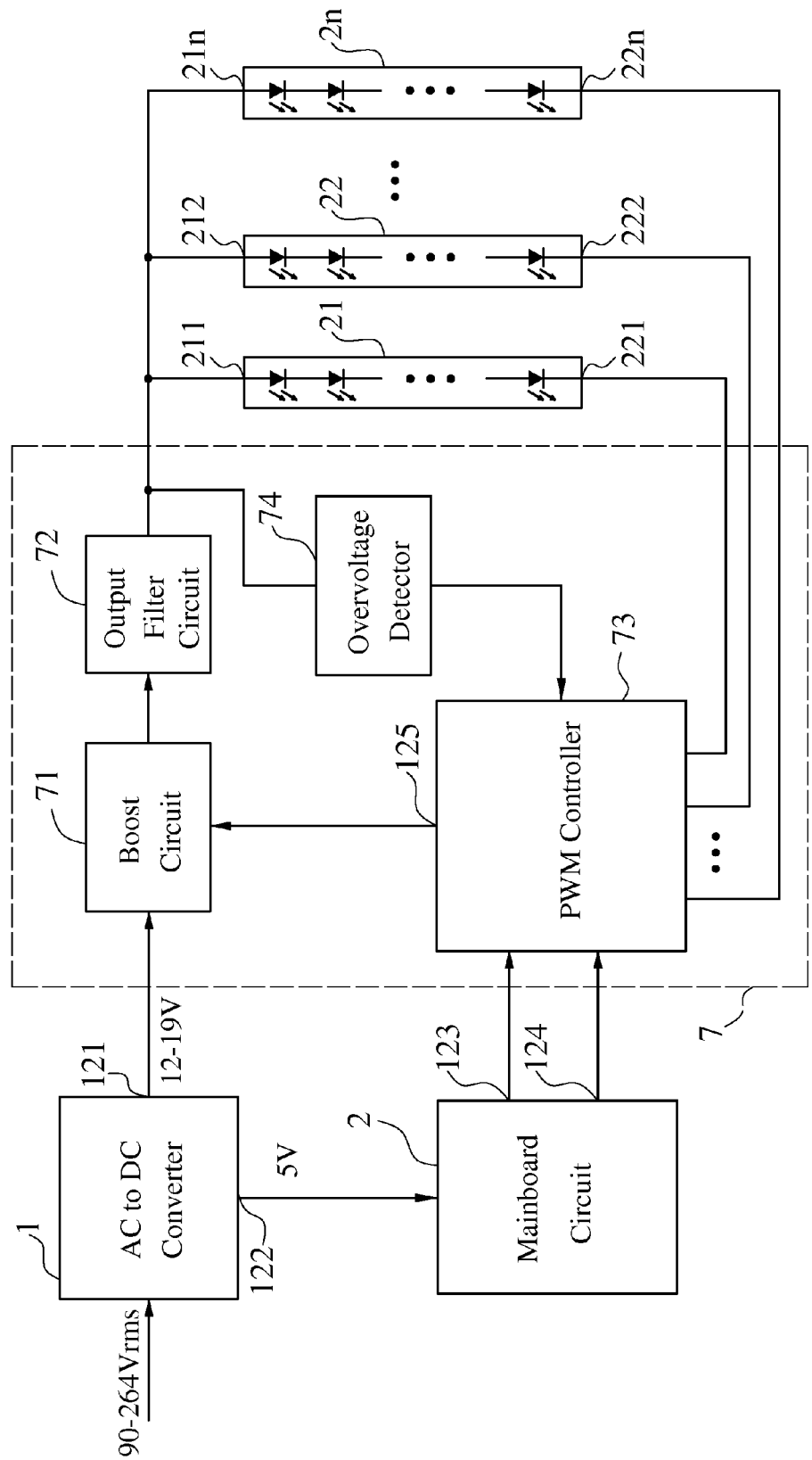
FIG. 1 is a schematic diagram illustrating a conventional driving circuit for an LED lamp.
Figure 2:
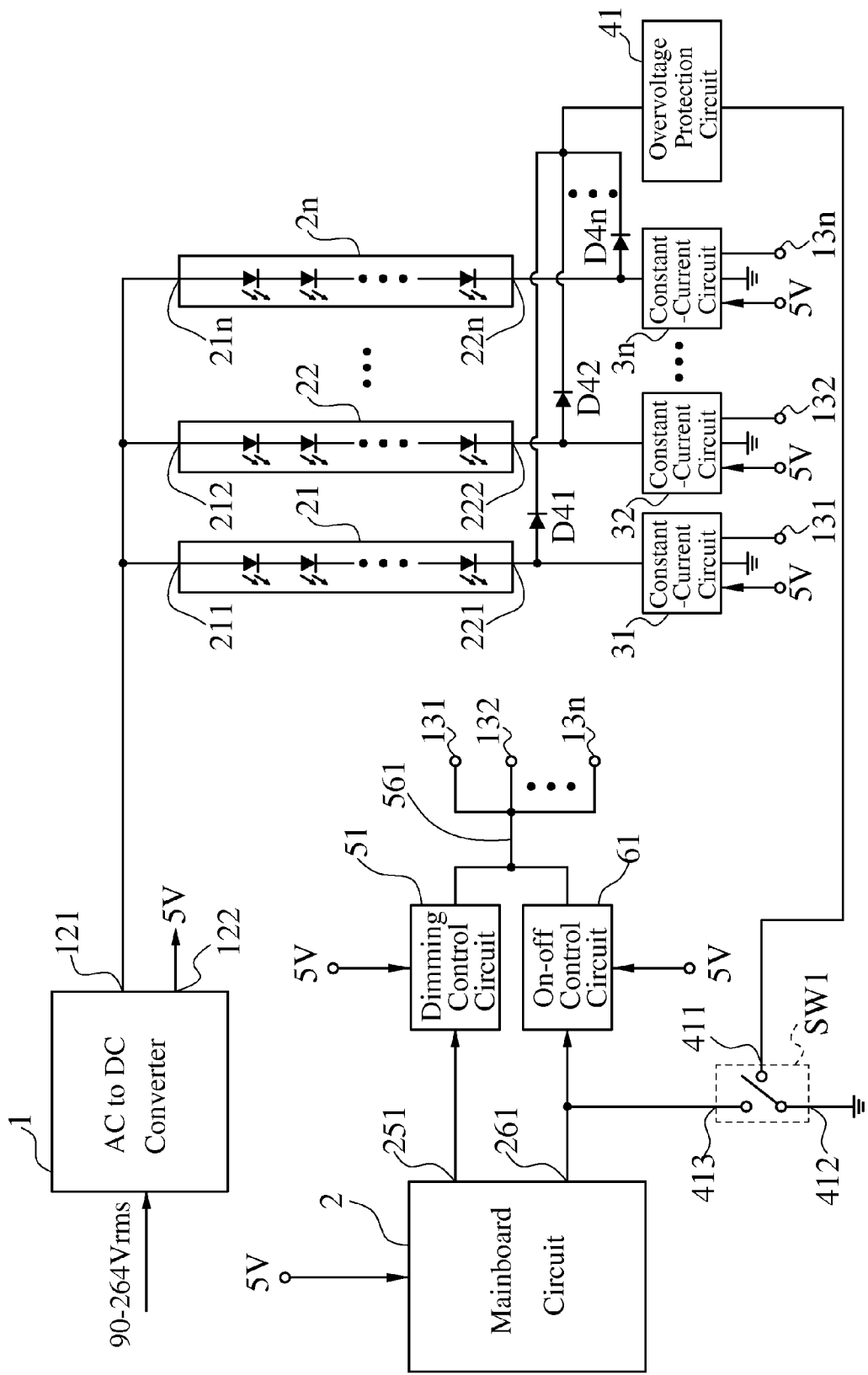
FIG. 2 is a schematic diagram illustrating an embodiment of a driving circuit for an LED lamp according to the present invention.

FIG. 2 is a schematic diagram illustrating an embodiment of a driving circuit for an LED lamp according to the present invention. Referring to FIG. 2, An LED lamp includes no more than 4 strings 21-2n, where n is a positive integer. Each string 2i has an input terminal 21i and an output terminal 22i and includes a plurality of LEDs coupled in series between the input terminal 21i and the output terminal 22i, where i is any integer from 1 to n. A driving circuit for the LED lamp includes an AC to DC converter 1, a plurality of constant current circuits 31-3n, a plurality of diodes D41-D4n, an overvoltage protection circuit 41, a dimming control circuit 51, an on-off control circuit 61 and a switch SW1.

An AC voltage of 90-264 Vrms input to the AC to DC converter 1. The AC to DC converter 1 converts the AC voltage into two DC voltages. A DC voltage of no more than 70V outputted from a terminal 121 to the input terminals 211-21n of the strings 21-2n. The DC voltage slightly greater than the maximum voltage drop among voltage drops of the strings 21-2n so as to ensure the string 2i and the constant current circuit 3i coupled in series to be able to work; that is, all string 21-2n or the LED lamp can work. Another DC voltage of 5V outputted from a terminal 122 to a mainboard circuit 2 and some internal components of the driving circuit such as the constant current circuits 31-3n, the dimming control circuit 51 and the on-off control circuit 61.

Each constant current circuit 3i coupled between the output terminal 22i of a corresponding string 2i and ground. When the constant current circuits 31-3n work, the constant current circuit 3i forces a current flowing through a corresponding string 2i to be or close to a fixed value so as to achieve the current balance of the strings 21-2n. When the constant current circuits 31-3n do not work, the output terminal 22i of the string 2i is not coupled to ground anymore and no current flows through the string 2i so that the LED lamp does not work.

Each diode D4i has an anode terminal coupled to the output terminal 22i of a corresponding string 2i and a cathode terminal coupled to the overvoltage protection circuit 41. If the DC voltage outputted from the terminal 121 is too high to make a voltage at the input terminal 21i of the string 2i too high, or if one or more LED(s) of the string 2i is/are short, a voltage at the output terminal 22i of the string 2i will be greater than a threshold voltage; that is, an overvoltage occurs in the output terminal of the string 2i. When a voltage at the output terminal of one of the strings 21-2n is greater than the threshold voltage, the overvoltage protection circuit 41 outputs an overvoltage control signal. When voltages at the output terminals of the strings 21-2n are less than the threshold voltage, the overvoltage protection circuit 41 does not output the overvoltage control signal anymore.

The dimming control circuit 51 receives a dimming control signal outputted from a terminal 251 of the mainboard circuit 2. The on-off control circuit 61 receives an on-off control signal outputted from a terminal 261 of the mainboard circuit 2. The dimming control circuit 51 and the on-off control circuit 61 are coupled to a terminal 561, and then coupled to terminals 131-13n of the constant current circuits 31-3n through the terminal 561 so as to be able to control the constant current circuits 31-3n. The dimming control circuit 51 controls, according to the dimming control signal, a duty cycle of working of the constant current circuits 31-3n so as to control a brightness of the LED lamp. The on-off control circuit 61 controls, according to the on-off control signal, whether the constant current circuits 31-3n work or not so as to control whether the LED lamp works or not.

The switch SW1 has a terminal 411 coupled to the overvoltage protection circuit 41 for being turned on or off according to the overvoltage control signal, a terminal 412 coupled to ground and a terminal 413 coupled to the terminal 261 of the mainboard circuit 2. When an overvoltage occurs in the output terminal of one of the strings 21-2n, the overvoltage protection circuit 41 outputs, for example, a high level voltage (i.e. to output the overvoltage control signal) to the terminal 411 to control the switch SW1 to be turned on so that the terminals 412 and 413 are closed and accordingly the on-off control signal is pulled down to a low level voltage to force the on-off control circuit 61 to control the constant current circuits 31-3n not to work. When no overvoltage occurs in the output terminals of the strings 21-2n, the overvoltage protection circuit 41 outputs, for example, a low level voltage (i.e. not to output the overvoltage control signal) to the terminal 411 to control the switch SW1 to be turned off so that the terminals 412 and 413 are open and accordingly the on-off control signal will not be disturbed.

Figure 3:
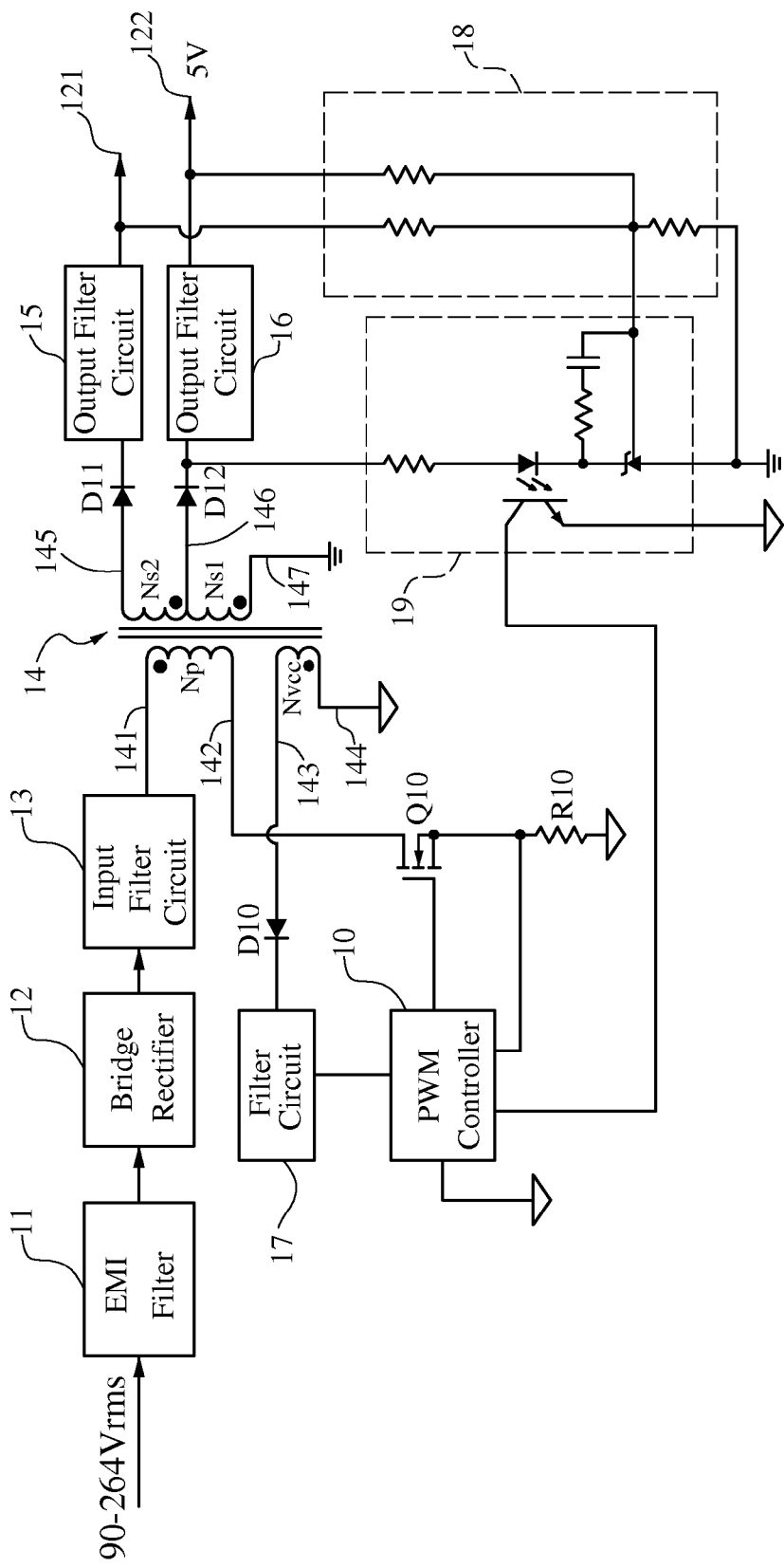
FIG. 3 is a schematic diagram illustrating an embodiment of the AC to DC converter shown in FIG. 2.

FIG. 3 is a schematic diagram illustrating an embodiment of the AC to DC converter shown in FIG. 2. Referring to FIG. 3, the AC to DC converter includes an electromagnetic interference (EMI) filter 11, a bridge rectifier 12, an input filter circuit 13, a flyback transformer 14, output filter circuits 15 and 16, a filter circuit 17, a sampling circuit 18, a feedback circuit 19, a PWM controller 10, an NMOS transistor Q10, a resistor R10 and diodes D10-D12. The AC voltage of 90-264 Vrms is input to the EMI filter 11. The EMI filter 11 is used to suppress the conducted electromagnetic noise. The bridge rectifier 12 rectifies the AC voltage through the EMI filter 11 into a pulsating voltage. The input filter circuit 13, such as an electrolytic capacitor, filters the pulsating voltage into a DC voltage.

The flyback transformer 14 includes primary windings Np and Nvcc and secondary windings Ns1 and Ns2. The primary winding Np has a dotted terminal 141 coupled to the input filter circuit 13 to receive the DC voltage and an undotted terminal 142 coupled to a drain terminal of the NMOS transistor Q10. A gate terminal of the NMOS transistor Q10 is coupled to an output terminal of the PWM controller 10, a source terminal of the NMOS transistor Q10 is coupled to a terminal of the resistor R10 and a current detecting terminal of the PWM controller 10, and another terminal of the resistor R10 is coupled to ground. The resistor R10 is used to detect a current flowing through the primary winding Np, and the PWM controller 10 controls, according to the current detected by the resistor R10, the duty cycle of switching of the NMOS transistor Q10 so as to control the amount of energy transferred from the primary winding Np to the secondary windings Ns1 and Ns2. The primary winding Nvcc has a dotted terminal 144 coupled to ground and an undotted terminal 143 coupled to an anode terminal of the diode D10. A cathode terminal of the diode D10 is coupled to the filter circuit 17. The diode D10 is used to rectify a voltage induced on the primary winding Nvcc into a pulsating voltage, and the filter circuit 17 converts the pulsating voltage into a DC voltage to supply power to the PWM controller 10.

The secondary winding Ns1 has a dotted terminal 147 coupled to ground and an undotted terminal 146 coupled to an anode terminal of a diode D12. A cathode terminal of the diode D12 is coupled to the output filter circuit 16. The diode D12 is used to rectify a voltage induced on the secondary winding Ns1 into a pulsating voltage, and the output filter circuit 16 converts the pulsating voltage into the DC voltage of 5V to output from the terminal 122 to supply power to the mainboard circuit 2 and some internal components of the driving circuit. The secondary winding Ns2 has a dotted terminal 146 coupled to ground and an undotted terminal 145 coupled to an anode terminal of the diode D11. A cathode terminal of the diode D11 is coupled to the output filter circuit 15. The diode D11 is used to rectify a voltage induced on the secondary winding Ns2 into a pulsating voltage, and the output filter circuit 15 converts the pulsating voltage into the DC voltage of slightly greater than the maximum voltage drop among voltage drops of the strings 21-2n to output from the terminal 121 to supply power to the input terminals 211-21n of the strings 21-2n.

The ratio of the turns of the secondary windings Ns1 and Ns2 can determine the ratio of the DC voltages outputted from the terminals 121 and 122. For example, the turns of the secondary winding Ns1 is assumed to be 3 and the DC voltage outputted from the terminal 121 is required to be 60 V. By using the equation Ns1/(Ns1+Ns2)=5V/60V, it obtains Ns2 is 33; that is, the turns of the primary windings Ns2 must be 33 in theory to ensure the DC voltage outputted from the terminal 121 is 60V. The sampling circuit 18 samples the DC voltages at the terminals 121 and 122 into a sample voltage, and the sample voltage is sent to a feedback terminal of the PWM controller 10 through the feedback circuit 19 so as to feedback control the DC voltages outputted from the terminals 121 and 122.

Figure 4:
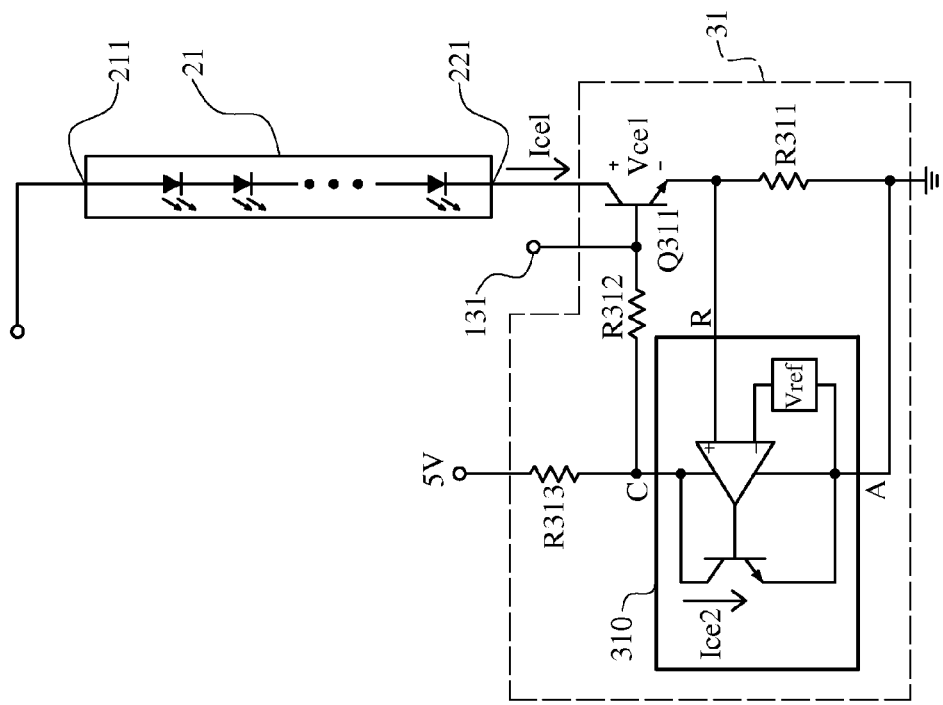
FIG. 4 is a schematic diagram illustrating an embodiment of the constant current circuit shown in FIG. 2.

FIG. 4 is a schematic diagram illustrating an embodiment of the constant current circuit shown in FIG. 2. Referring to FIG. 4, the constant current circuits 31-3n have the same work principle. Taking the constant current circuit 31 as an example, the constant current circuit 31 includes an NPN transistor Q311, a shunt regulator 310 (such as an IC whose model name is TL431 or AZ431) and resistors R311-R313. The output terminal 221 of the string 21 is coupled to a collector terminal of the NPN transistor Q311, an emitter terminal of the NPN transistor Q311 is coupled to a reference terminal R of the shunt regulator 310 and a terminal of the resistor R311, another terminal of the resistor R311 is coupled to ground, an anode terminal A of the shunt regulator 310 is coupled to ground, a cathode terminal C of the shunt regulator 310 is coupled to a terminal of the resistor R312 and a terminal of the resistor R313, another terminal of the resistor R312 is coupled to a base terminal of the NPN transistor Q311, and another terminal of the resistor R313 is coupled to receive the DC to voltage of 5V.

Figure 5:
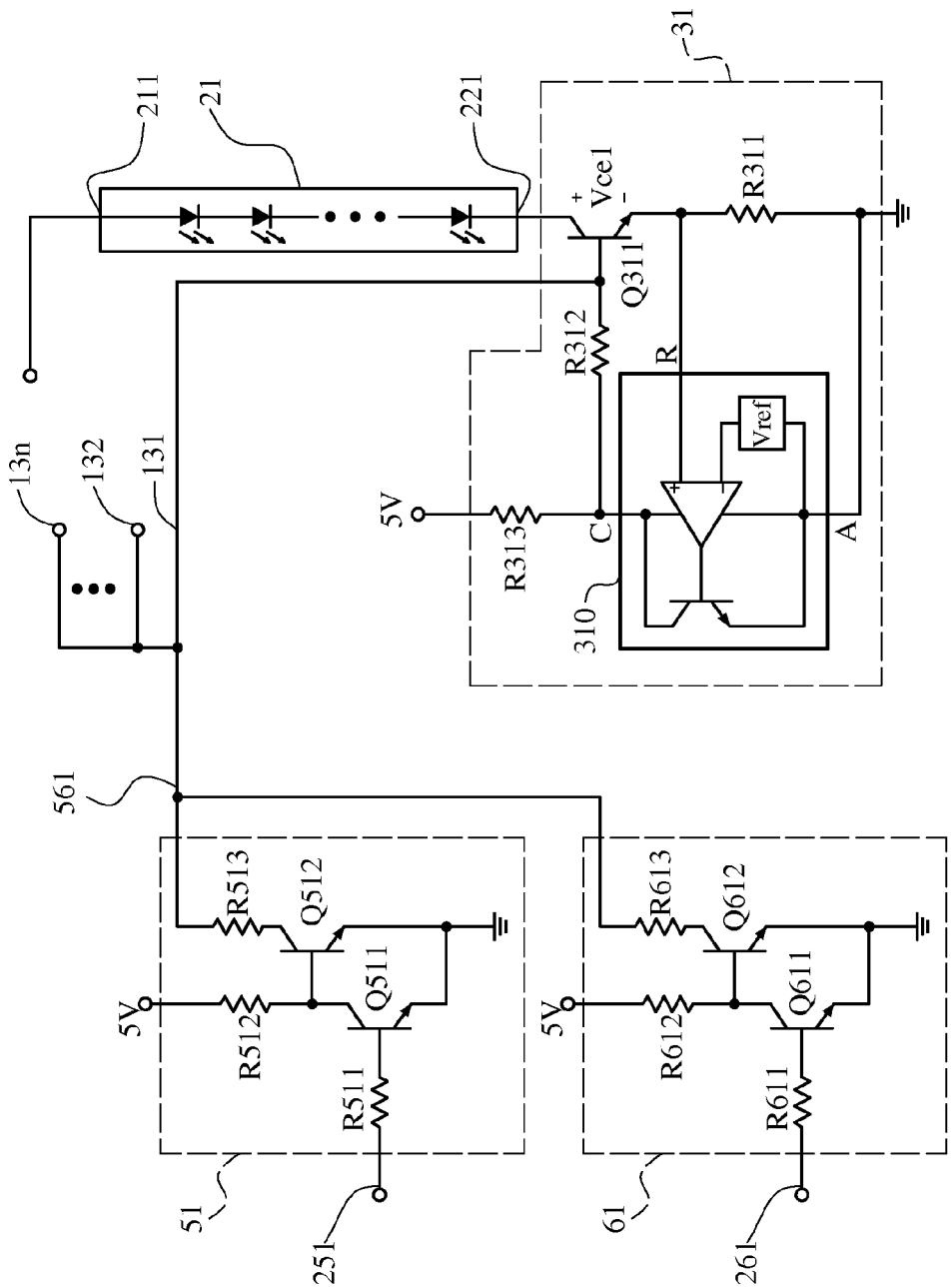
FIG. 5 is a schematic diagram illustrating an embodiment of the dimming control circuit and the on-off control circuit shown in FIG. 2.
Figure 6:
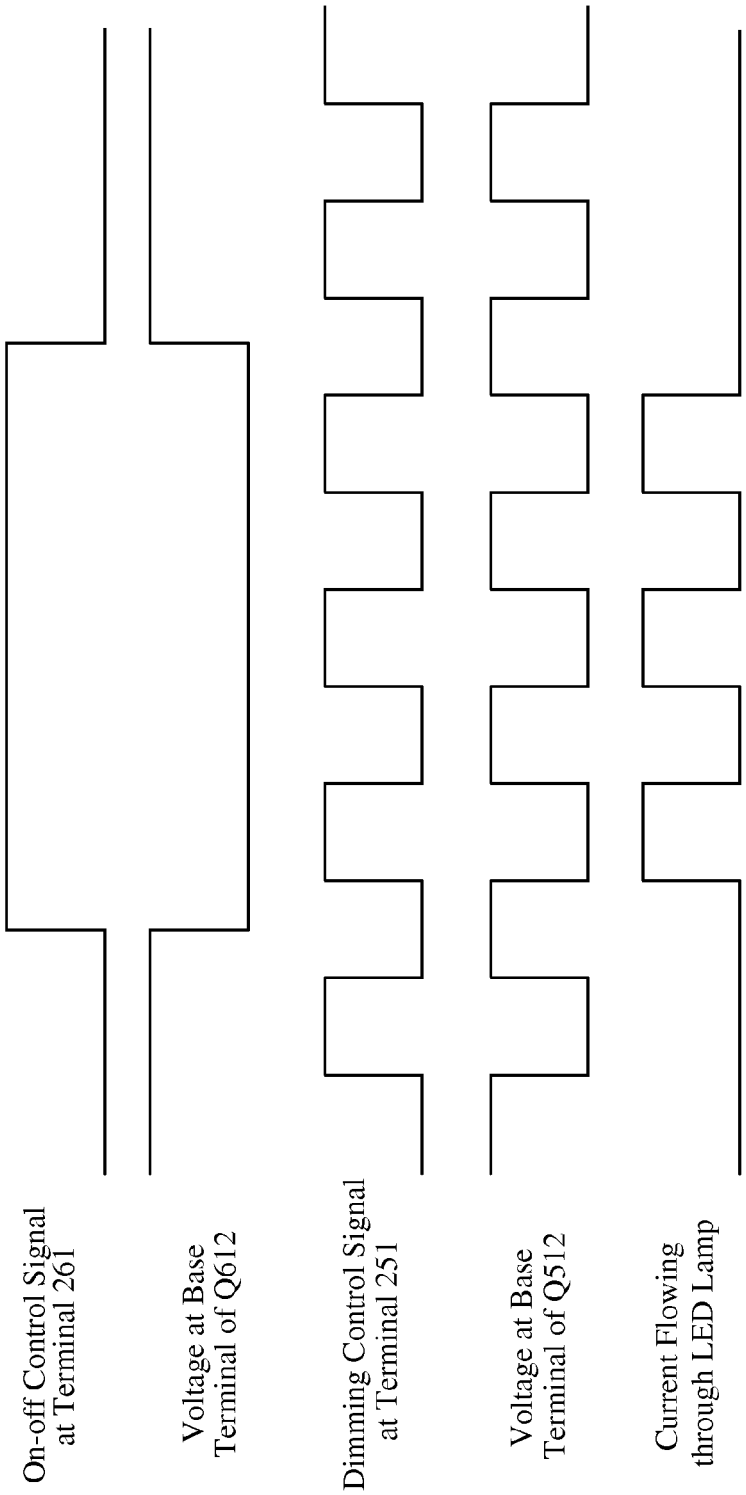
FIG. 6 is a timing diagram illustrating the dimming control circuit and the on-off control circuit shown in FIG. 5 controlling whether the LED lamp works or not.

When a voltage at the input terminal 211 of the string 21 increases by a voltage $\Delta V$, a current flowing through the string 21 increases so that a current Ice1 flowing through the collector and the emitter terminals of the NPN transistor Q311 increases so that a voltage at the reference terminal R of the shunt regulator 310 (VR=Ice1×R311) increases so that a current Ice2 flowing through a collector and an emitter terminals of a transistor in the shunt regulator 310 increases so that a voltage at the cathode terminal C (VC=5V−Ice2×R313) decreases so that a current flowing through the base and the emitter terminals of the NPN transistor Q311 decreases so that the current Ice1 decreases so that the voltage at the reference terminal R decreases and a voltage Vce1 across the collector and the emitter terminals of the NPN transistor Q311 increases by the voltage $\Delta V$ so as to achieve a negative feedback control. Similarly, when a voltage at the input terminal 211 of the string 21 decreases by a voltage $\Delta V$, a current Ice1 decreases so that a voltage at the reference terminal R decreases so that a current Ice2 decreases so that a voltage at the cathode terminal C increases so that the current Ice1 increases so that the voltage at the reference terminal R increases and a voltage Vce1 across the collector and the emitter terminals of the NPN transistor Q311 decreases by the voltage $\Delta V$ so as to achieve a negative feedback control FIG. 5 is a schematic diagram illustrating an embodiment of the dimming control circuit and the on-off control circuit shown in FIG. 2, and FIG. 6 is a timing diagram illustrating the dimming control circuit and the on-off control circuit shown in FIG. 5 for controlling whether the LED lamp works or not. Referring to FIGS. 5 and 6, the on-off control circuit 61 includes NPN transistors Q611 and Q612 and resistors R611-R613. A terminal of the resistor R611 is coupled to the terminal 261 of the mainboard circuit 2 to receive the on-off control signal, another terminal of the resistor R611 is coupled to a base terminal of the NPN transistor Q611, an emitter terminal of the NPN transistor Q611 is coupled to ground, a collector terminal of the NPN transistor Q611 is coupled to a base terminal of the NPN transistor Q612 and a terminal of the resistor R612, another terminal of the resistor R612 is coupled to receive the DC voltage of 5V, an emitter terminal of the NPN transistor Q612 is coupled to ground, a collector terminal of the NPN transistor Q612 is coupled to a terminal of the resistor R613, and another terminal of the resistor R613 is coupled to the terminal 561 to be then coupled to the terminals 131-13n, in which the terminal 131 is coupled to the base terminal of the NPN transistor Q311 in the constant current circuit 31.

When the on-off control signal outputted from the terminal 261 is at high level, the NPN transistor Q611 is turned on so that a voltage at the base terminal of the NPN transistor Q612 is a low level voltage so that the NPN transistor Q612 is turned off. When the on-off control signal is at low level, the NPN transistor Q611 is turned off so that the voltage at the base terminal of the NPN transistor Q612 is a high level voltage so that the NPN transistor Q612 is turned on so that a voltage at the base terminal of the NPN transistor Q311 is pulled down to a low level voltage and the resistors R613, R312 and R313 should satisfy that Vce612+(5V−Vce612)×R613/(R613+R312+R313) is less than a minimum voltage across the base and the emitter terminals of the NPN transistor Q311 when being turned on to ensure the NPN transistor Q311 to be turned off, where Vce612 is a voltage across the collector and the emitter terminals of the NPN transistor Q612 when being turned on. When the NPN transistor Q311 is turned off, no current flows through the string 21 and accordingly the string 21 does not work.

The dimming control circuit 51 includes NPN transistors Q511 and Q512 and resistors R511-R513. A terminal of the resistor R511 is coupled to the terminal 251 of the mainboard circuit 2 to receive the dimming control signal, another terminal of the resistor R511 is coupled to a base terminal of the NPN transistor Q511, an emitter terminal of the NPN transistor Q511 is coupled to ground, a collector terminal of the NPN transistor Q511 is coupled to a base terminal of the NPN transistor Q512 and a terminal of the resistor R512, another terminal of the resistor R512 is coupled to receive the DC voltage of 5V, an emitter terminal of the NPN transistor Q512 is coupled to ground, a collector terminal of the NPN transistor Q512 is coupled to a terminal of the resistor R513, and another terminal of the resistor R513 is coupled to the terminal 561 to be then coupled to the terminals 131-13n, in which the terminal 131 is coupled to the base terminal of the NPN transistor Q311 in the constant current circuit 31.

When the dimming control signal outputted from the terminal 251 is at high level, the NPN transistor Q511 is turned on so that a voltage at the base terminal of the NPN transistor Q512 is a low level voltage so that the NPN transistor Q512 is turned off. When the dimming control signal is at low level, the NPN transistor Q511 is turned off so that the voltage at the base terminal of the NPN transistor Q512 is a high level voltage so that the NPN transistor Q512 is turned on so that a voltage at the base terminal of the NPN transistor Q311 is pulled down to a low level voltage and the resistors R513, R312 and R313 should satisfy that Vce512+(5V−Vce512)×R513/(R513+R312+R313) is less than a minimum voltage across the base and the emitter terminals of the NPN transistor Q311 when being turned on to ensure the NPN transistor Q311 to be turned off, where Vce612 is a voltage across the collector and the emitter terminals of the NPN transistor Q512 when being turned on. When the NPN transistor Q311 is turned off, no current flows through the string 21 and the string 21 does not work.

Accordingly, when the dimming control signal outputted from the terminal 251 or the on-off control signal outputted from the terminal 252 is at low level, each NPN transistor (such as Q311) in the constant current circuits 31-3n is turned off to control the strings 21-2n not to work so that the LED lamp does not provide light (dark). When both of the dimming control signal and the on-off control signal are at high level, each NPN transistor (such as Q311) in the constant current circuits 31-3n is turned on to control the strings 21-2n to work so that the LED lamp provides light (bright). During the on-off control signal at high level, if the frequency of the dimming control signal is above 150 Hz, the human eye will perceive an average brightness related to the ratio of the bright and dark periods of the LED lamp. Therefore, the brightness of the LED lamp can be adjusted by changing a duty cycle of the dimming control signal related to the ratio of the bright and dark periods. This brightness dimming method is known as the PWM dimming or burst mode dimming.

Figure 7:
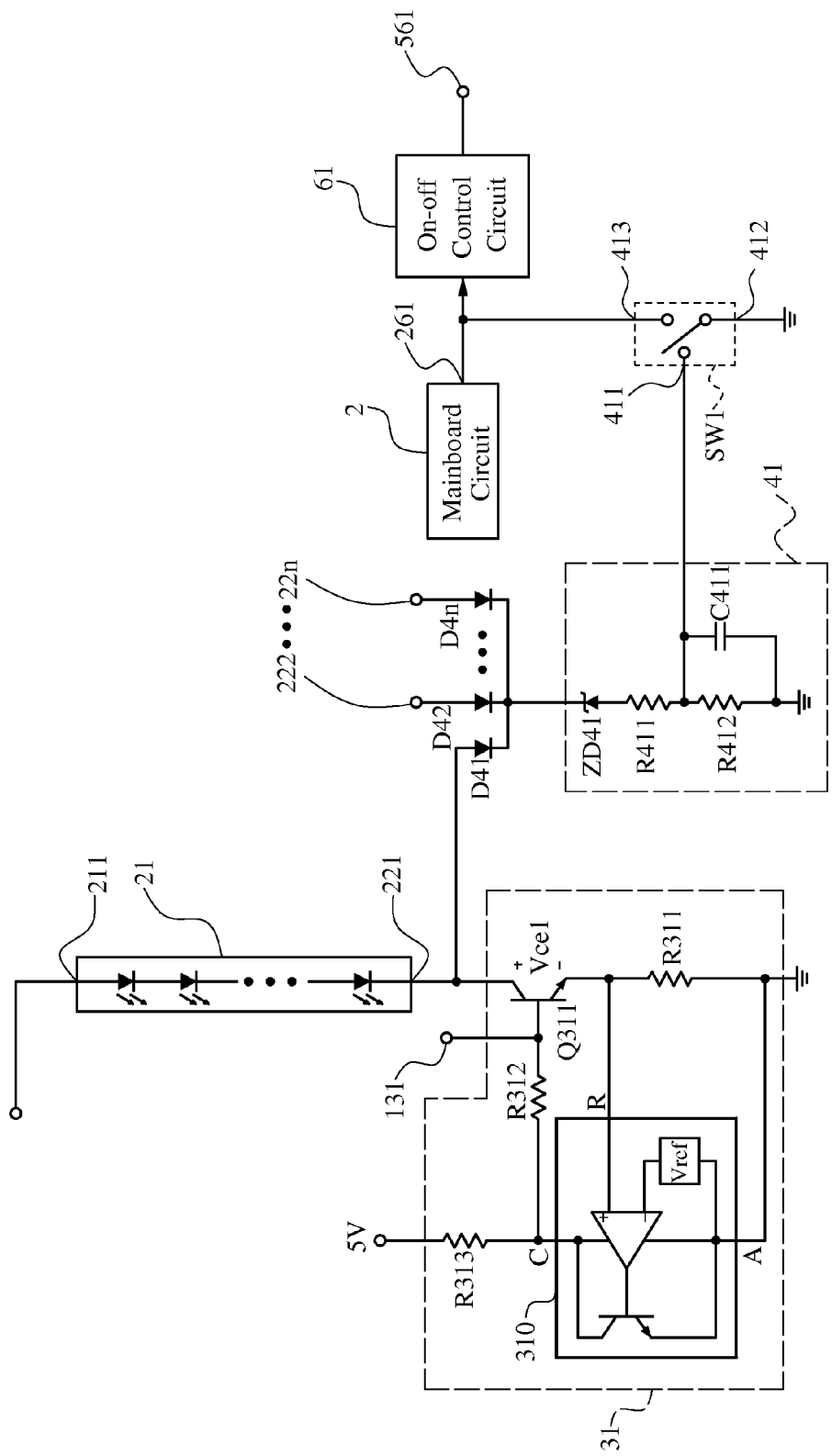
FIG. 7 is a schematic diagram illustrating an embodiment of the overvoltage protection circuit shown in FIG. 2.

FIG. 7 is a schematic diagram illustrating an embodiment of the overvoltage protection circuit shown in FIG. 2. Referring to FIG. 7, when the voltage at the input terminals 211-21n increases by a voltage ΔV, the voltage ΔV is applied to the voltage across the collector and the emitter terminals of the NPN transistor in each constant current circuit 3i (such as the NPN transistor Q311 in the constant current circuit 31. In addition, when one or more LED(s) of the string 2i is/are short, the forward voltage(s) of the short LED(s) is/are applied to the voltage across the collector and the emitter terminals of the NPN transistor in each constant current circuit 3i. Accordingly, the increase of the voltage at the input terminals 211-21n or the short of one or more LED(s) of the string 2i will increase the voltage at the output terminal 22i of the corresponding string 2i so as to increase the power consumption of the NPN transistor in the corresponding constant current circuit 3i. The overvoltage protection circuit 41 is used to detect whether an overvoltage occurs in the output terminals 221-22n of the strings 21-2n or not by comparing the voltages at the output terminals 221-22n of the strings 21-22 with the threshold voltage.

The overvoltage protection circuit 41 includes a Zener diode ZD41, resistors R411 and R412 and a capacitor C411. A cathode terminal of the Zener diode ZD41 is coupled to the cathode terminals of the diodes D41-D4n, an anode terminal of the Zener diode ZD41 is coupled to a terminal of the resistor R411, another terminal of the resistor R411 is coupled to a terminal of the resistor R412, a terminal of the capacitor C411 and the terminal 411 of the switch SW1, another terminal of the resistor R412 and another terminal of the capacitor C411 are coupled to ground. The diodes D41-D4n are used to prevent the voltages at the output terminals 221-22n of the strings 21-2n from interference. The capacitor C411 is used to filter high-frequency noise. The switch SW1 may be implemented by an NPN transistor or an NMOS transistor.

It is assumed that the forward voltages of the diodes D41-D4n each is Vf1, the breakdown voltage of the Zener diode ZD41 is Vzd1 and the voltage at the terminal 411 is Vsw1 when the switch SW1 is turned on. When the voltage at the output terminal 221 of the string 21 is greater than the threshold voltage so that the Zener diode ZD41 operates in reverse breakdown region, a voltage at the anode terminal of the Zener diode ZD41 is (VR+Vce1−Vf1−Vzd1) and then voltage-divided by the resistors R411 and R412 to output a voltage of (VR+Vce1−Vf1−Vzd1)×R412/(R412+R411) greater than Vsw1 to cause the switch SW1 to be turned on and accordingly the on-off control signal is pulled down to a low level voltage to force the on-off control circuit 61 to control the constant current circuits 31-3n not to work. When the voltages at the output terminals 221-22n of the strings 21-2n are less than the threshold voltage so that the Zener diode ZD41 operates in reverse bias region, the overvoltage protection circuit 41 output a low level voltage to cause the switch SW1 to be turned off and accordingly the on-off control signal will not be disturbed because the LED lamp does not need the overvoltage protection.

In summary, the invention introduces the driving circuit including the AC to DC converter using the flyback topology and a general-purpose PWM controller IC to directly supply power to the LED lamp including fewer strings each through which more current flows so as to reduce design cost and avoid the EMI problem caused by the switching of the power transistor(s) of the DC to DC boost converter. Moreover, the invention introduces the constant current circuits to control the currents flowing through the strings to be constant when working and accordingly uses the PWM dimming. Furthermore, the overvoltage protection circuit to perform the overvoltage protection when a voltage at one input terminal is too high or a short circuit occurs in one string.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

We claim:

1. A driving circuit for a light-emitting diode (LED) lamp comprising no more than 4 strings each having an input and an output terminals and comprising a plurality of LEDs coupled in series between the input and the output terminals, the driving circuit for receiving an on-off control signal and a dimming control signal and outputting a direct-current (DC) voltage of no more than 70 volts to the input terminals of the strings, the driving circuit comprising:

a plurality of diodes, each having an anode terminal coupled to the output terminal of a corresponding string and a cathode terminal;

an overvoltage protection circuit, coupled to the cathode terminals of the diodes, for outputting an overvoltage control signal when a voltage at the output terminal of one of the strings is greater than a threshold voltage;

a plurality of constant current circuits, each coupled between the output terminal of a corresponding string and ground, the on-off control signal for controlling whether the constant current circuits work or not so as to control whether the LED lamp works or not, the dimming control signal for controlling a duty cycle of working of the constant current circuits so as to control a brightness of the LED lamp; and a switch for forcing the on-off control signal to control the constant current circuits not to work when receiving the overvoltage control signal.

2. The driving circuit according claim 1, further comprising an alternating-current (AC) to DC converter for receiving an AC voltage and converting the AC voltage into the DC voltage.

3. The driving circuit according claim 2, wherein the AC to DC converter comprises an AC to DC converter using a flyback topology.

4. The driving circuit according claim 1, wherein each constant current circuit comprises a shunt regulator, an NPN transistor and a resistor, a collector terminal of the NPN transistor is coupled to the output terminal of a corresponding string, an emitter terminal of the NPN transistor is coupled to a terminal of the resistor and a reference terminal of the shunt regulator, another terminal of the resistor and an anode terminal of the shunt regulator is coupled to ground, a cathode terminal of the shunt regulator is coupled to a base terminal of the NPN transistor.

5. The driving circuit according claim 1, further comprising an on-off control circuit for receiving the on-off control signal and controlling whether the constant current circuits work or not according to the on-off control signal.

6. The driving circuit according claim 5, wherein the on-off control signal is outputted by a mainboard circuit.

7. The driving circuit according claim 1, further comprising a dimming control circuit for receiving the dimming control signal and controlling the duty cycle of working of the constant current circuits according to the dimming control signal.

8. The driving circuit according claim 7, wherein the dimming control signal is outputted by a mainboard circuit.

9. The driving circuit according claim 1, wherein the overvoltage protection circuit comprises a Zener diode, two resistors and a capacitor, a cathode terminal of the Zener diode is coupled to the cathode terminals of the diodes, an anode terminal of the Zener diode is coupled to a terminal of one resistor, another terminal of the one resistor is coupled to a terminal of the other resistor, a terminal of the capacitor and the switch SW1, another terminal of the other resistor and another terminal of the capacitor are coupled to ground, when a voltage at the output terminal of one of the strings is greater than the threshold voltage, the Zener diode operates in to reverse breakdown region so that the voltage at the output terminal of the one of the strings is applied through the resistors and the capacitor to generate the overvoltage control signal, when voltages at the output terminals of the strings are less than the threshold voltage, the Zener diode operates in reverse bias region so that the voltage at the output terminal of the one of the strings is not applied through the resistors and the capacitor to stop generating the overvoltage control signal.

10. The driving circuit according claim 1, wherein the switch comprises an NPN transistor or NMOS transistor.

* * * * *